Jan. 31, 1967  J. L. McLARTY  3,301,505
DELIVERY HEAD FOR A FILAMENT WINDING APPARATUS
Filed Jan. 21, 1965
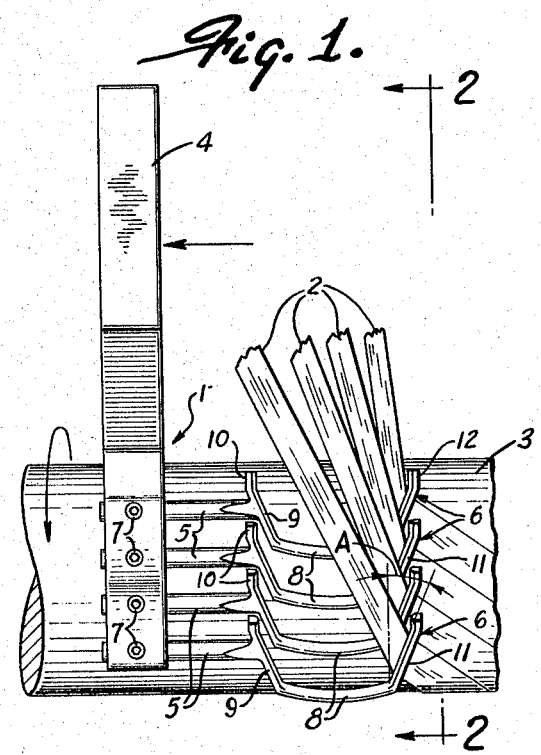
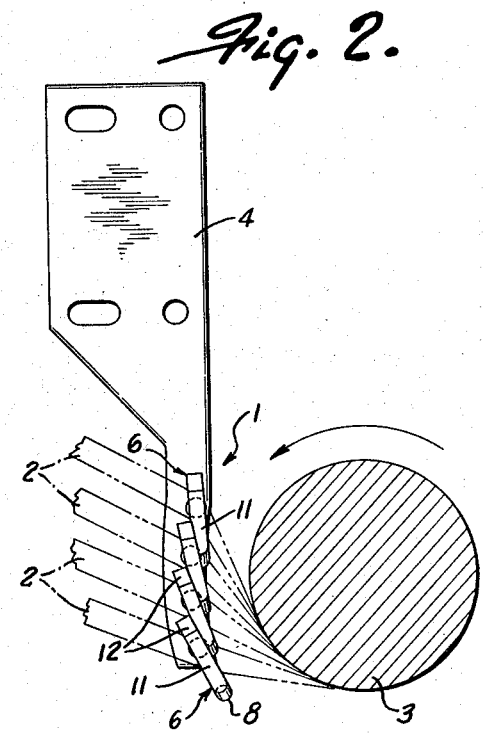
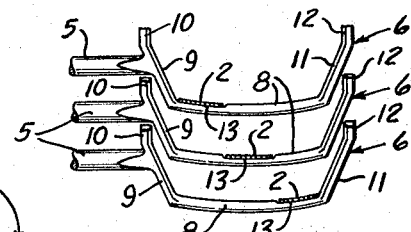
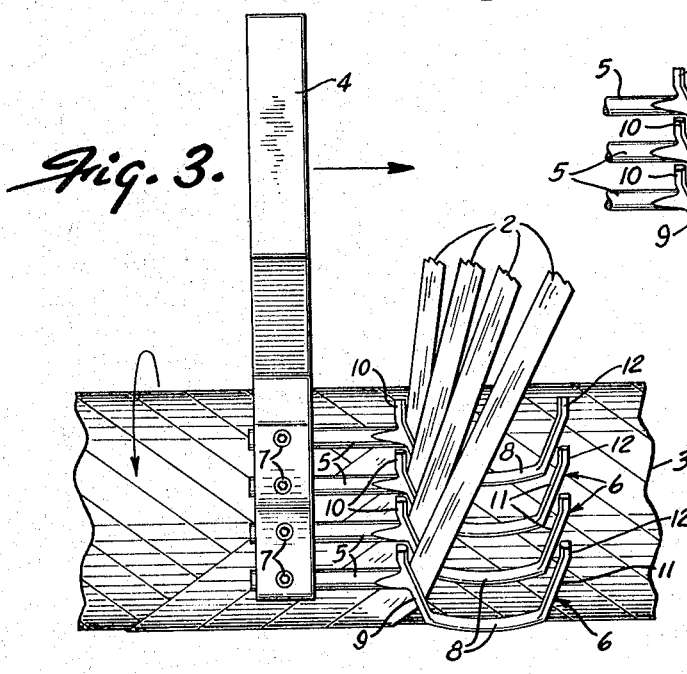
INVENTOR.
JACK LOWRIE MCLARTY
BY
Andrus & Starke
ATTORNEYS United States Patent Office 3,301,505
Patented Jan. 31, 1967

3,301,505
DELIVERY HEAD FOR A FILAMENT
WINDING APPARATUS
Jack Lowrie McLarty, Milwaukee, Wis., assignor to McClean-Anderson, Inc., Milwaukee, Wis., a corporation of Wisconsin
Filed Jan. 21, 1965, Ser. No. 426,822
8 Claims. (Cl. 242—157)

This invention relates to a delivery head for a filament winding machine and more particularly for a delivery head for guiding a series of strands of reinforcing material onto a mandrel.

Fiber reinforced resin articles can be fabricated by winding a strand of reinforcing material on a mandrel in a generally helical pattern in a series of superimposed layers. In a typical winding procedure, the mandrel is rotated about its axis and a winding head moves in a reciprocating path along a given length of the mandrel and guides the strand onto the mandrel in the winding pattern. It is desired in most winding procedures to apply the strand or band of reinforcing material in a side-by-side relation so that a continuous layer of fibers is obtained. As the winding angle is decreased, the winding angle being defined as the angle between the axis of the mandrel and the position of the band being placed on the mandrel, it is necessary to increase the width of the band in order to get this side-by-side relationship in each layer. A wide band is generally more difficult to deliver onto the mandrel, for a substantial amount of waste occurs at the end of the winding pattern where the winding head reaches the end of its stroke and returns for the opposite stroke. In addition, it is difficult to keep a wide tape or band from slipping at the end of the mandrel at the point of the return stroke. Even when the mandrel is formed with a shoulder, the wide tape will overlap at the end and slippage is a problem. The outer fibers in the wide band will not follow a non-slipping path over the mandrel end because the non-slipping path is at the center of the band only.

The present invention is directed to a delivery head for a filament winding machine which serves to guide a series of relatively narrow strands of reinforcing material onto a mandrel at circumferentially spaced locations so that the effect is that of a single wide band. More specifically, the winding head is composed of a series of generally U-shaped guide yokes which are spaced circumferentially around at least a portion of the mandrel. Each yoke lies in a plane generally perpendicular to a radius of the mandrel so that the yokes are disposed at an angle to each other. The strand or strip of reinforcing material is disposed on the web of each guide yoke and as the head moves in its reciprocating path, the strand will trail off and is guided over the curved sides of the yoke onto the mandrel so that each strand is applied to the mandrel at circumferentially spaced locations. By adjusting the angularity and spacing of the yokes the series of strands can be applied to the mandrel in a side-by-side relation so that the effect is that of applying a wide band to the mandrel.

The delivery head of the invention eliminates the inherent disadvantages of using a wide band of reinforcing fibers. By applying a series of narrow strands, the waste at the ends of the path of travel of the winding head is substantially reduced and the problem of slippage of the strands at the end is also minimized.

The delivery head of the invention permits the reinforcing material to be wound either helically or circumferentially on the mandrel without any change or adjustment of the guide yokes.

In addition, the strands can be readily threaded onto the individual guide yokes at the start of a winding operation or in case of breakage of a strand, This is an important feature in that it substantially reduces the down time of the machine.

The drawings illustrate the best mode presently contemplated of carrying out the invention.

Other objects and advantages will appear in the course of the following description.

In the drawings:
FIG. 1 is plan view of the delivery head of the invention;
FIG. 2 is a section taken along line 2—2 of FIG. 1;
FIG. 3 is a view similar to FIG. 1 showing the head moving in the opposite direction; and
FIG. 4 is a view similar to FIG. 1 showing a modified type of yoke construction.

The drawings illustrate a delivery head 1 which is adapted to guide a series of strands or strips 2 of reinforcing material onto the outer surface of a rotating mandrel 3 to form a tubular article, such as a pipe section, or the like.

The strands 2 can be composed of substantially continuous unidirectional fibers, or can be formed of woven fabric, braided tubing, matting, or the like. The fibrous material from which the strands 2 are formed can be mineral fibers such as glass or asbestos; vegetable fibers such as cotton; animal fibers such as wool; synthetic fibers such as nylon, Orlon, Dacron, rayon or metal fibers such as steel wire.

The fibrous strands 2 can be impregnated with a suitable thermoplastic or thermosetting resin in any conventional manner. It has been found that glass fibers impregnated with an epoxy resin such as the reaction product of epichlorohydrin and Bisphenol A as disclosed in Patent 2,801,227 provides a very satisfactory winding material.

In most operations, the resin is applied to the fibers before the fiber strand 2 reaches the delivery head 1. The resin can be applied by dipping, spraying, brushing or the like. In some cases the resin or other coating material may be in the partially cured, solid state rather than the liquid state.

The delivery head 1 includes a support member 4 which is mounted on a reciprocating carriage or winding head, not shown, and extends outwardly over the mandrel 3. The support member 4 is provided with a series of openings which receive the shanks 5 of a series of guide yokes 6. The shanks 5 are retained within the openings by set screws 7 and the angularity of the guide yokes can be readily adjusted by loosening the set screws 7 and rotating the shanks 5 within the openings.

Each guide yoke 6 includes a generally curved base portion or web 8, a sloping side portion 9 and an inner end portion 10 which connects the side portion 9 to the shank 5. The outer end of each guide yoke 6 comprises a sloping side portion 11 which terminates in an end portion 12 disposed generally parallel to the end portion 10.

The yokes 6 are circumferentially and uniformly spaced around the mandrel 3 and may extend around the complete circumference, or, as shown in the drawings, may extend around only a portion of the circumference of the mandrel. The yokes are positioned at an angle to each other, as shown in FIG. 2, with the angularity between adjacent yokes being uniform. In addition, the axes of the shafts 5 lie on a circle having its center coinciding with the axis of the mandrel, and the plane of each yoke is substantially perpendicular to a radius of the mandrel.

The end portion 12 of each yoke is spaced a slight distance from the end portions of adjacent yokes so that the strands 2 can be threaded between adjacent end portions 12 at the start of the winding operation or in case a strand breaks and rethreading is necessary.

At the start of the winding operation the strands 2 are disposed on the base portion 8 of the respective guide yokes and to start the winding, the mandrel is rotated about its axis, and the winding head 1 is moved longitudinally of the mandrel as shown by the arrow in FIG. 1. The structure employed to rotate the mandrel and reciprocate the delivery head is of a conventional nature, and the structure disclosed in the copending application Serial No. 330,919, filed December 16, 1963 entitled Drive Mechanism, is suitable for this purpose.

As the delivery head 1 is moved in the direction of the arrow in FIG. 1, the strands 2 will trail off across the web 8 and ride on the sloping portions 11. The end sections 12 prevent the strand from riding completely off the yokes. Due to the circumferential arrangement of the yokes, the strands 2 contact the mandrel at circumferentially spaced locations and are wound in a side-by-side relation, with the side edges of each strand positioned in abutting relation to the side edges of adjacent strands. Thus, the effect is to wind a wide strip having the combined width of the individual strands.

The winding angle is determined by the relative speeds of the mandrel and the winding head as well as the size of the angle A, as shown in FIG. 1. As the angle A is increased, the winding angle increases, meaning that it approaches circumferential, and by changing to yokes having a different angle A, the winding angle can be varied.

When the delivery head 1 reaches the end point in its reciprocating stroke of travel it reverses and moves in the direction of the arrow in FIG. 3. The strands 2 then trail off across the web and ride on the sloping portions 9 of the yokes, and in this stroke the end portions 10 prevent the strands from riding completely off the yokes. The strands are again wound on the mandrel in a side-by-side relation, having the effect of a wide band, to provide a second layer of the tubular article. This procedure is repeated with the delivery head moving back and forth along the mandrel to build up the desired number of superimposed layers.

After the desired number of layers have been applied to the mandrel, the wound article is stripped from the mandrel and the resin is cured to provide a strong resin-bonded article.

A modified form of the invention is shown in FIG. 4 which is particularly adapted for circumferential winding. To wind a purely circumferential pattern, the mandrel 3 is rotated but the delivery head 1 is stationary, and the strands are wound on the mandrel circumferentially or without a helix angle. When winding circumferentially, the strands 2 ride on the web 8 of the guide yokes 6 and usually the fibers of the strand will spread out laterally across the web in the form of a thin wide strand. As the mandrel rotates, each strand, as it is applied to the mandrel, completely overlaps the other previously wound strands.

FIG. 4 illustrates a yoke structure which will prevent this complete overlap of strands during circumferential winding. In this modified construction, the web 8 of each guide yoke 6 is formed with a generally depressed or concave section 13. The depressed sections 13 of adjacent yokes are not in alignment, and, as shown in FIG. 4, the section 13 of one yoke is adjacent the inner sloping portion 9, while the depressed section 13 in the next yoke is located centrally of the web 8 and the depressed section in the following yoke is located adjacent the outer sloping portion 11. The depressed sections 13 have a length substantially equal to the width of the strands 2, and when winding circumferentially, each strand will migrate to the corresponding depressed section 13 so that the strands 2 will be wound in a side-by-side relation during the circumferential winding operation. When winding in a helical pattern, the strands merely ride across the depressed sections 13 as they move between the sloping guide portions 9 and 11.

The present invention, by utilizing narrow strands of reinforcing material which are applied in the form of a wide band eliminates the problem of slippage of the strand at the ends of the mandrel. Slippage is a definite problem when using a wide band and this is so even though the mandrel ends may be formed with steps or shoulders. In addition, the use of a wide band produces a substantial amount of waste at the ends of the wound article, and this waste is minimized by using the delivery mechanism of the invention which winds a series of relatively narrow strands.

As a further advantage, the strands can be wound either helically or circumferentially without changing or adjusting the guide yokes.

Various modes of carrying out the invention are contemplated as being within the scope of the following claims particularly pointing out and distinctly claiming the subject matter which is regarded as the claims.

I claim:

1. In an apparatus for winding a tubular article, a rotatable mandrel, a plurality of guide members located outwardly of the mandrel and spaced circumferentially over at least a portion of the circumference of the mandrel and adapted to reciprocate along the mandrel, each guide member having an elongated strand supporting surface with the axis of said supporting surface extending generally parallel to the axis of the mandrel, and means disposed at least at one end of the strand supporting surface for preventing displacement of a strand from said surface during the winding operation.

2. In an apparatus for winding a tubular article, a rotatable mandrel, and a plurality of guide members spaced outwardly of the mandrel and arranged circumferentially over at least a portion of the circumference of the mandrel and adapted to reciprocate along the mandrel, each guide member including a web portion extending generally parallel to the axis of the mandrel and including a pair of diverging side portions extending outwardly from the ends of the web portion, whereby strands are guided onto the mandrel by said side portions as the guide members are reciprocated along the length of the mandrel.

3. In an apparatus for winding a tubular article, a rotatable mandrel, and a delivery head adapted to reciprocate along the mandrel and guide a series of strands onto the mandrel, said delivery head including a plurality of guide yokes located outwardly of the mandrel and circumferentially spaced over at least a portion of the circumference of the mandrel, each guide yoke including a web portion disposed substantially parallel to the axis of the mandrel and a pair of side portions sloping outwardly from each end of the web portion, each guide yoke also including an end portion projecting from the corresponding side portions and disposed generally normal to said web portion, whereby strands are guided onto the mandrel over said sloping side portions and the end portions preventing displacement of said strands from said side portions.

4. The structure of claim 3 in which the axes of the web portions of the guide members are located on a circle having its center coinciding with the axis of the mandrel.

5. In an apparatus for winding a tubular article, a rotatable mandrel, and a delivery head adapted to reciprocate along the mandrel and guide a series of strands onto the mandrel, said delivery head including a plurality of generally U-shaped guide yokes located outwardly of the mandrel and circumferentially spaced over at least a portion of the circumference of the mandrel, each of said yokes lying in a plane with the plane of each yoke being disposed at an angle to the plane of adjacent yokes, said delivery head also including a support member and a plurality of shafts with each shaft supporting a respective yoke, said shafts being adjustably mounted on the support member to provide an adjustment of angularity for the individual yokes with respect to the mandrel.

6. The structure of claim 3 in which an end portion of each yoke is spaced from the corresponding end portions of adjacent yokes whereby a strand may be threaded between said end portions.

7. In an apparatus for winding a tubular article, a rotatable mandrel, and a delivery head adapted to reciprocate along the mandrel and guide a series of strands onto the mandrel, said delivery head including a plurality of generally U-shaped guide yokes located outwardly of the mandrel and circumferentially spaced over at least a portion of the circumference of the mandrel, each guide yoke including a web having a strand supporting surface, the axis of the web extending substantially parallel to the axis of the mandrel and each guide yoke including a pair of diverging side portions extending outwardly and at an angle to said web, the strand supporting surface of each web having a depression with the depression in one web disposed out of alignment with the depression on adjacent webs, whereby a strand is guided on each said strand supporting surface and each strand tends to migrate to the depression in the corresponding web during the winding operation whereby the strands are wound circumferentially in a side-by-side relation on the mandrel.

8. The structure of claim 7 in which the side edge of a depression in one web is in substantial alignment with the opposite side edge of a depression in the next adjacent web.

References Cited by the Examiner
UNITED STATES PATENTS

| | | | |
|---|---|---|---|
| 2,558,849 | 7/1951 | Hodge | 156—425 X |
| 2,910,821 | 11/1959 | Nixon | 57—15 |
| 3,201,298 | 8/1965 | Baker et al. | 242—11 X |

STANLEY N. GILREATH, *Primary Examiner.*